United States Patent
Holcomb et al.

(10) Patent No.: US 6,926,599 B2
(45) Date of Patent: Aug. 9, 2005

(54) SHELLFISH DRESSING DEVICE AND METHOD

(75) Inventors: David A. Holcomb, Seattle, WA (US); Jason O. Germany, Seattle, WA (US)

(73) Assignee: Chef'n Corporation, Seattle, WA (US)

( * ) Notice: Subject to any disclaimer, the term of this patent is extended or adjusted under 35 U.S.C. 154(b) by 0 days.

(21) Appl. No.: 10/736,867

(22) Filed: Dec. 16, 2003

(65) Prior Publication Data

US 2005/0130573 A1 Jun. 16, 2005

(51) Int. Cl.⁷ .............................................. A22B 5/10
(52) U.S. Cl. ................................................... 452/102
(58) Field of Search ............... 30/120.1, 173; 452/2–6, 452/102, 103; 83/607; 99/537, 542, 552, 99/559, 540, 554, 568

(56) References Cited

U.S. PATENT DOCUMENTS

| | | | |
|---|---|---|---|
| 642,973 A * | 2/1900 | Galbreath | 30/173 |
| 1,219,857 A | 3/1917 | Parkhurst | |
| 1,611,541 A * | 12/1926 | McCrocklin et al. | 30/120.1 |
| 1,987,368 A * | 1/1935 | McGary et al. | 47/1.01 R |
| 2,039,850 A | 5/1936 | Silaj | 17/7 |
| 2,753,905 A | 7/1956 | Anderson | 146/13 |
| 3,071,802 A | 1/1963 | Gambardella | 17/7 |
| 3,395,421 A | 8/1968 | Harless, Jr. | 17/7 |
| D234,182 S | 1/1975 | Mann et al. | D7/105 |
| 4,103,395 A | 8/1978 | Latorella | 17/71 |
| 4,397,087 A | 8/1983 | Burrage | 30/120.3 |
| 4,519,136 A | 5/1985 | Walker | 30/142 |
| 4,521,964 A | 6/1985 | Maruyama | 30/148 |
| 4,716,627 A | 1/1988 | Scott, Jr. | 17/73 |
| 5,108,343 A | 4/1992 | Gilliam | 452/6 |
| D376,963 S | 12/1996 | Davis | D7/693 |
| 6,019,673 A | 2/2000 | Saizon | 452/6 |
| 6,129,622 A | 10/2000 | Seaman et al. | 452/6 |
| 6,503,137 B2 * | 1/2003 | Maille | 452/17 |
| D469,668 S | 2/2003 | Prommel | D7/686 |

* cited by examiner

Primary Examiner—Thomas Price
(74) Attorney, Agent, or Firm—Seed IP Law Group PLLC

(57) ABSTRACT

A device for dressing shellfish comprises a handle and a working end. The handle can have a pair of handle members manually actuable with a single hand. The working end can incorporate a pair of blades connected to the respective handle members. The blades can be coupled to each other near their distal ends at least one can be adapted to bend laterally at a central region when one or both of the handles is actuated. The blades can be manipulable between an aligned configuration to facilitate insertion of the working end into the shellfish, and a spread configuration in which one or more of the blades can penetrate the shell. Removal of the device from the shellfish while the working end is retained in the spread configuration can form a slit along the length of the shellfish, facilitating removal of meat therefrom.

26 Claims, 5 Drawing Sheets

SHELLFISH DRESSING DEVICE AND METHOD

BACKGROUND OF THE INVENTION

1. Field of the Invention

This invention relates to hand-operated devices, and in particular, to devices for use in facilitating the removal of meat from shellfish, such as crab.

2. Description of the Related Art

People have been eating shellfish for ages. Shellfish have exoskeletons or shells that encase the edible portions of the animal. The shells can be difficult to remove. As a result, people have been developing devices to facilitate the dressing, cooking and eating of shellfish for almost as long as they have eaten them. Typically, these devices include plier-type mechanisms with teeth to grip the often slippery portion of the shellfish being opened, and with elongated lever-arms to make cracking the shell easier.

For crabs and similar shellfish, the job of removing meat from the shell can be particularly difficult because the crabs' legs are long and relatively narrow. The nutcracker-type devices discussed above can be used, with which the shell is cracked sequentially along the length of the leg and is then broken along a lengthwise crack and the meat removed. In addition, picking tools have been developed to allow a person to reach into a partially cracked or un-cracked leg and remove meat therefrom.

With most or all of these tools, eating shellfish is still a time-consuming job.

BRIEF SUMMARY OF THE INVENTION

The present invention is directed toward devices and methods for use in preparing and eating shellfish, such as crab. In one embodiment, the device can incorporate a handle and a working end. The handle can have a pair of handle members, at least one of which is movable relative to the other between two distinct positions. The working end can similarly have a pair of blades coupled at their proximal ends to a corresponding one of the handle members. The blades can be coupled to each other at a point located distally with respect to the central portion of the blades, and are adapted such that the central portion of the blade is movable laterally. The blades can be operated by manipulating the handle members, moving between an aligned configuration in which the blades are at aligned with each other and a spread configuration in which the central portion of at least one of the blades is spaced apart laterally from the central portion of the other blade. The aligned configuration facilitates insertion of the working end into the shellfish, while the spread configuration punctures the shell with the central portion of the blade. By removing the device from the shellfish while retaining the working end in the spread configuration, the device can make a slit along the length of the shellfish, facilitating removal of the meat therefrom.

In one particular embodiment, the device incorporates blades made of substantially rigid material, wherein each blade is assembled from a pair of substantially rigid members pivotally linked to each other at their central region. The blades are also pivotally coupled together at their distal ends, and are fixedly coupled at their proximal ends to the handle members to pivot therewith. When the handle members are pivoted relative to each other, the proximal ends of the blades pivot relative to each other in response. When the proximal portions of the blades rotate outward, the distal portions of the blades pivot in opposing directions to compensate for this movement, so that the distal ends of the blades can remain in a constant longitudinal alignment.

In other embodiments, the materials and configuration can vary, while maintaining the spirit of the invention. Versions of the invention can use flexible materials instead of rigid materials, can use more or fewer linkages, and can be bilaterally symmetrical or asymmetrical. One of ordinary skill in the art, having reviewed this entire disclosure, will appreciate these and other variations that can be made to the embodiments shown and described below.

DETAILED DESCRIPTION OF THE INVENTION

Figure 1:
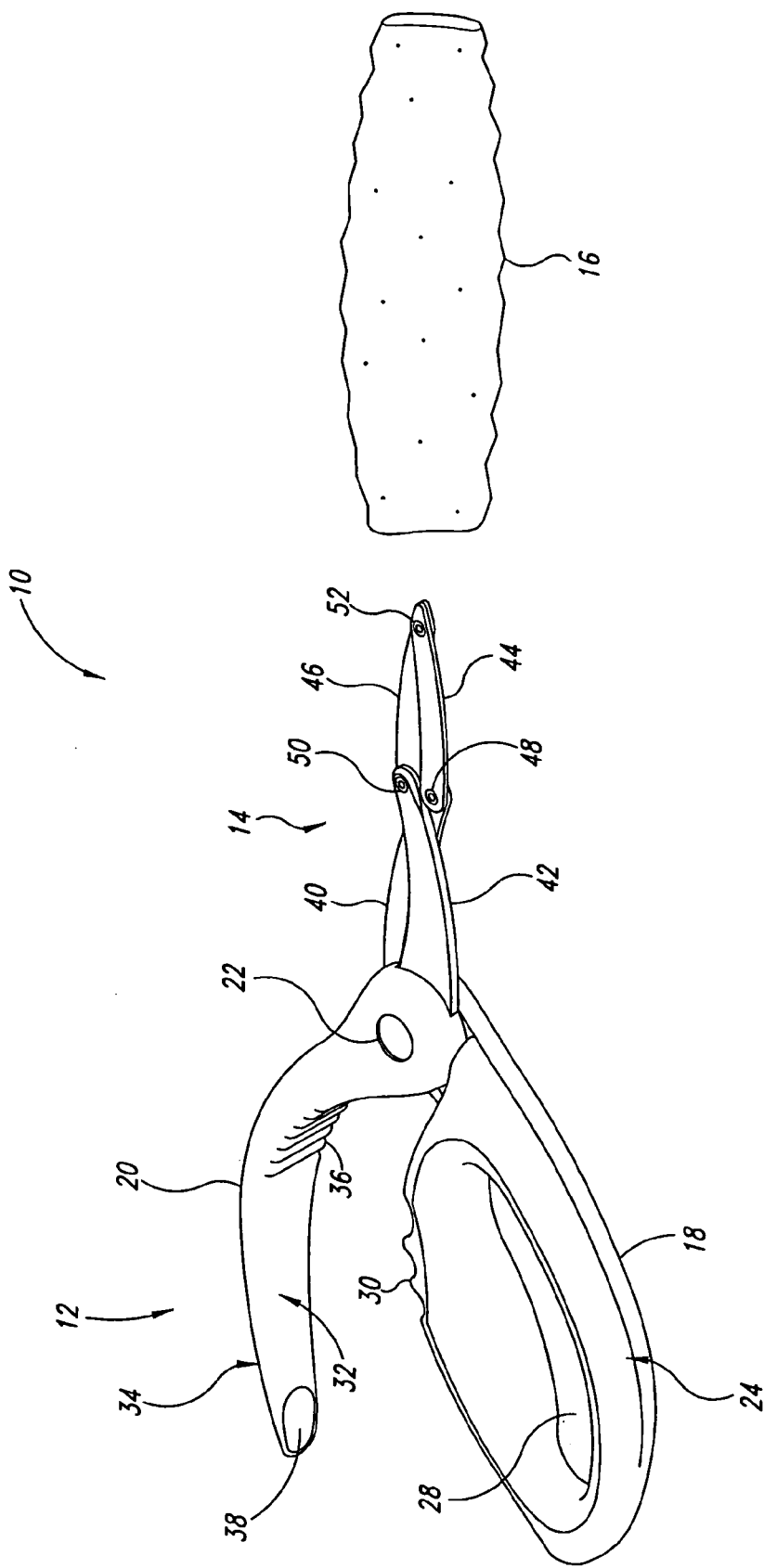
FIG. 1 is an isometric of a piece of shellfish and a shellfish dressing device according to one embodiment of the present invention, in an aligned configuration.

The present invention is directed toward a shellfish dressing device. Many specific details are provided and illustrated to help explain the construction and operation of the one particular embodiment of the invention. The invention could take on other embodiments, and one of ordinary skill in the art, having reviewed the present disclosure in its entirety, would readily appreciate modifications that could be made to the illustrated embodiment without deviating from the spirit of the invention. Thus the invention is not to be limited to the specific embodiment illustrated in the drawing and described in connection therewith.

Figure 2:
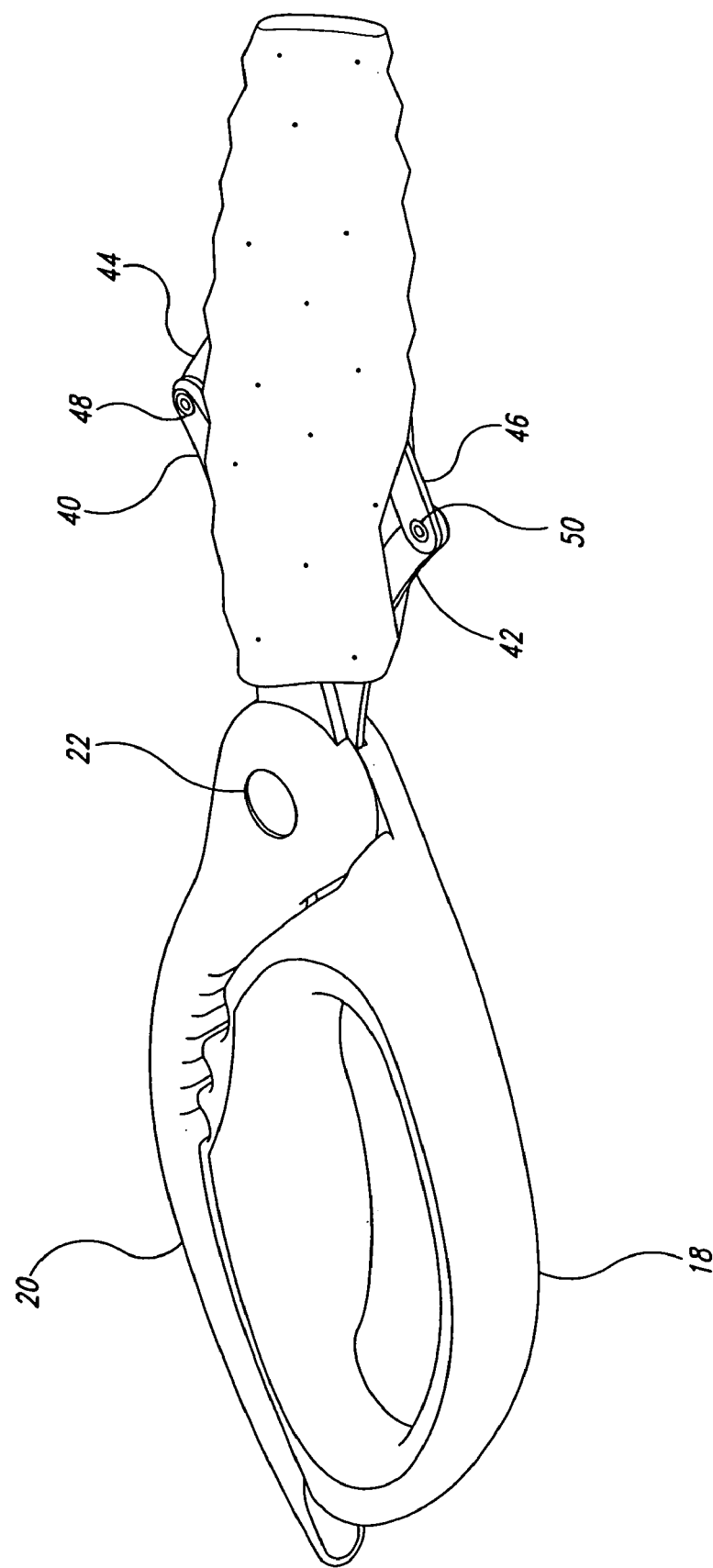
FIG. 2 is an isometric of the piece of shellfish and the shellfish dressing device of FIG. 1, in a spread configuration.
Figure 3:
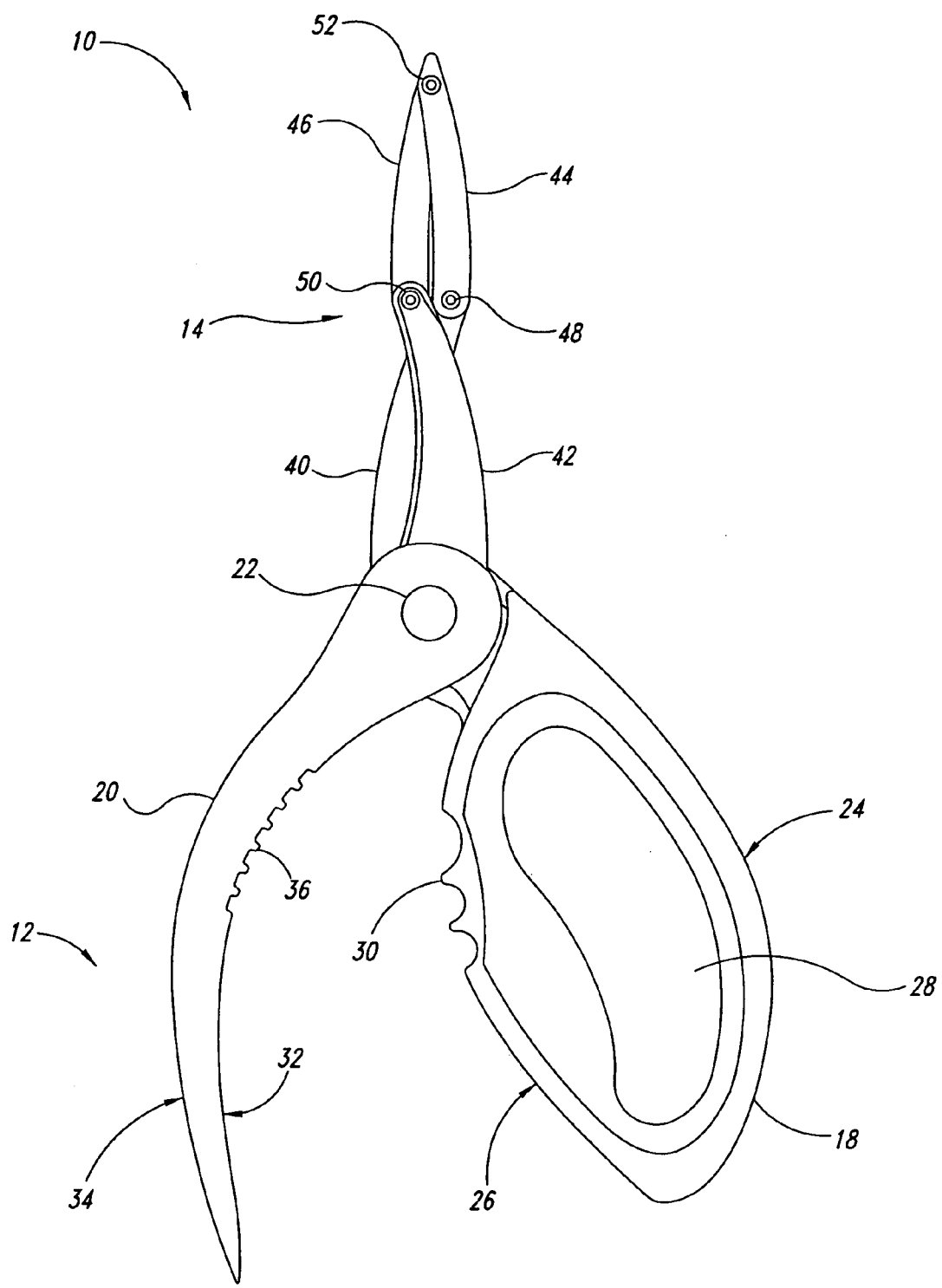
FIG. 3 is a plan view of the shellfish dressing device of FIG. 1 in the open configuration.
Figure 4:
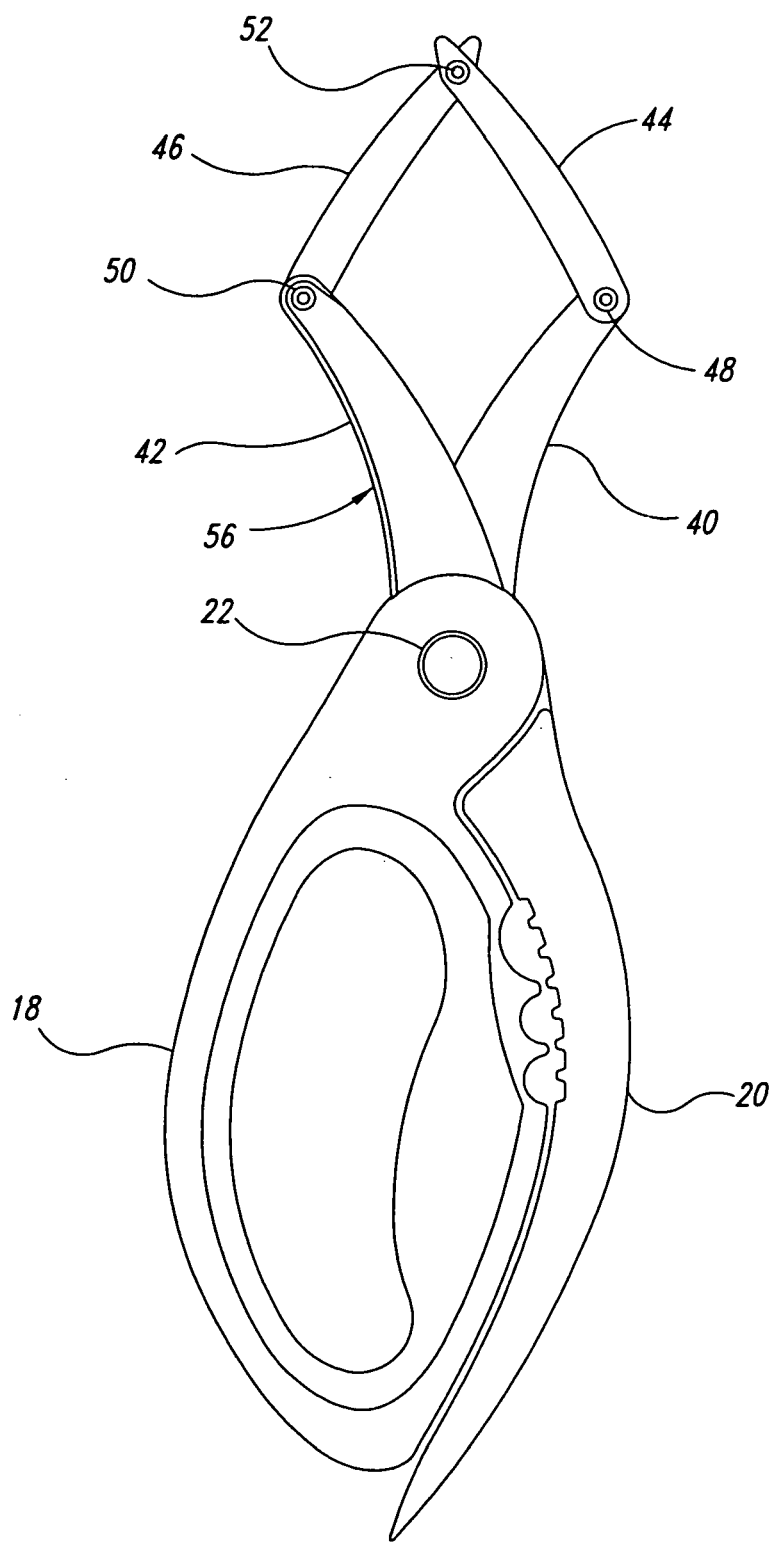
FIG. 4 is a plan view of the shellfish dressing device of FIG. 1 in the closed configuration.
Figure 5:
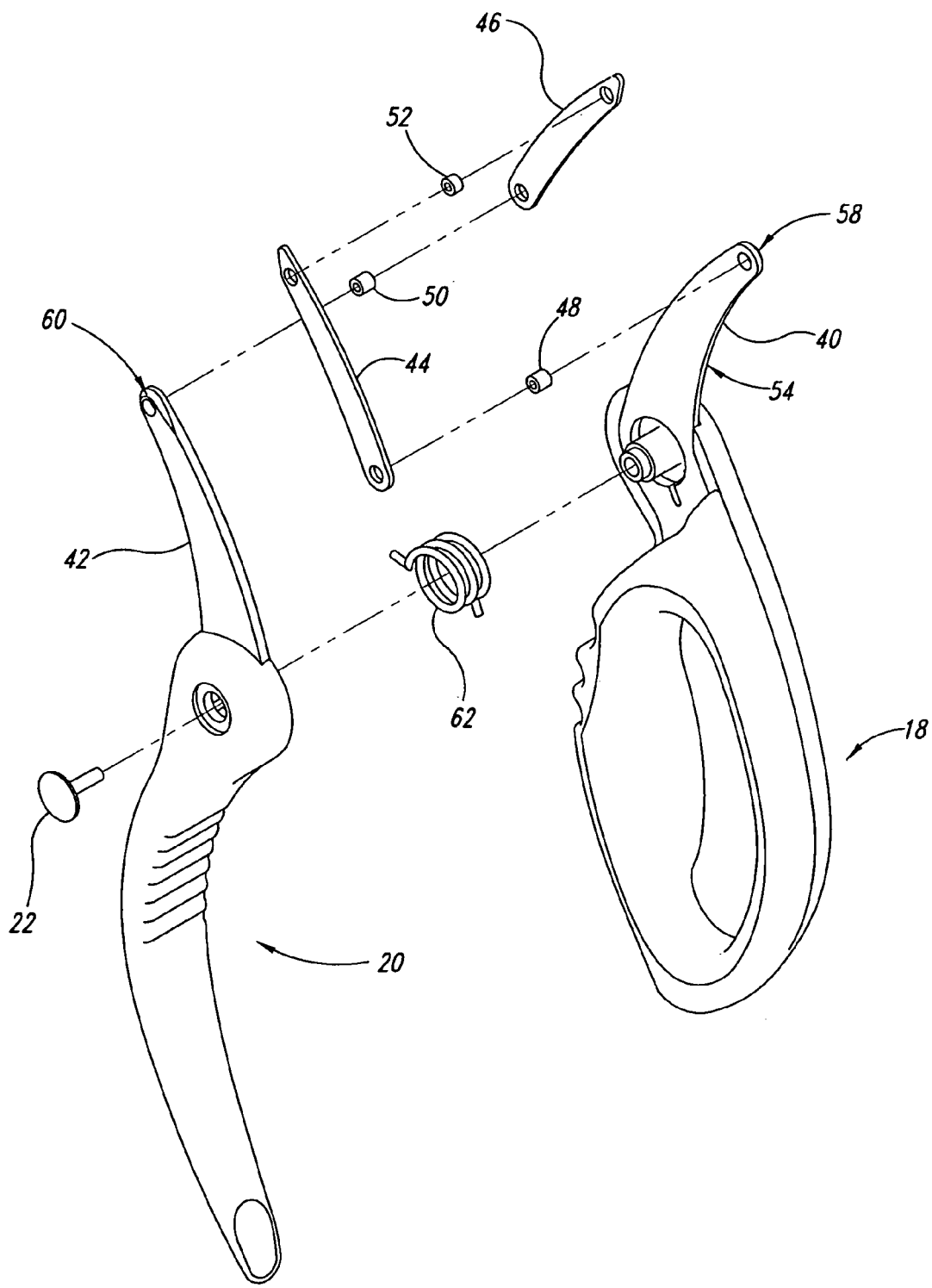
FIG. 5 is an exploded isometric view of the shellfish dressing device of FIG. 1.

FIGS. 1–5 illustrate a shellfish dressing device 10 according to one particular embodiment of the present invention. In general, the device 10 is made up of a handle 12 and a working end 14. The handle 12 is manually actuable to manipulate the working end 14 during use to facilitate the removal of meat from a piece of shellfish, such as a crab leg section 16, as shown in FIGS. 1 and 2.

The illustrated handle 12 is manipulable in a manner equivalent to a scissor handle, between open (FIG. 1) and closed (FIG. 2) configurations. An inner handle member 18 and an outer handle member 20 are pivotally coupled together at a hinge joint 22. The illustrated handle 12 is not only manipulable to actuate the working end 14, but can also be used itself to crack shells. To do so, a shell is positioned between the outer and inner handle members 18,20 and the handle members are moved toward the closed configuration to crack the shell therebetween.

The inner handle member 18 has a closed grip with an external surface 24, an internal surface 26 and a hole 28 for gripping during use. The hole 28 can be countoured to comfortably receive an operator's fingers during use. The internal surface 26 incorporates several inner protrusions 30 to facilitate retaining and cracking shells between the inner and outer handle members 18,20. The external surface 24 can extend along the width of the user's hand, providing a surface that the user can force against a table or other object to help crack difficult shells.

The outer handle member 20 can have an internal surface 32 shaped to complement the shape the inner handle member 18, and an external surface 34 contoured to comfortably rest in the user's palm during use. The internal surface 32 of the outer handle member 20 can incorporate outer protrusions 36 positioned to align with the inner protrusions 30 during use. The outer protrusions 36 can work with the inner protrusions 30 to grip and crack shells during use. The outer handle member 20 can terminate in a spoon 38, which can be used to separate meat from a piece of shellfish.

The inner and outer handle members 18,20 are fixedly coupled to first and second proximal blades 40,42, respectively, to move as a unit therewith. The proximal blades 40,42 are angled with respect to the inner and outer handle members 18,20, such that when the handle members are in the open position (FIG. 3), the proximal blades are generally aligned with each other. Depending on the size and shape of the respective handle members 18,20, the angular offset of the proximal blades 40,42 can vary accordingly.

The proximal blades 40,42 are pivotally coupled to respective distal blades 44,46 at a pair of central couplings 48,50. In the illustrated embodiment, proximal blade 40 is coupled to distal blade 44 and proximal blade 42 is coupled to distal blade 46. The ends of the distal blades 44,46 opposite the proximal blades 40,42 are pivotally coupled to each other at a pin-type linkage 52. As a result, when the proximal blades 40,42 are actuated to rotate with respect to each other, the distal blades 44,46 follow them, but linkage 52 retains the distal ends of the distal blades together, causing each distal blade to rotate in a direction opposite the respective proximal blade.

One or more of the blades 40,42,44,46 can be configured to facilitate the cutting, piercing and/or splitting of a shell. For example, the distal blades can have chamfers 54,56, respectively, or can have likewise beveled or sharpened edges, to cut a shell from the inside. Likewise, the distal ends of the proximal blades 40,42 can have sharpened faces 58,60 to puncturing a shell from the inside. In addition or instead, the distal-most end of one or both of the distal blades 44,46 can be pointed or otherwise adapted to facilitate insertion of the working end 14 of the device 10 into a piece of shellfish.

The device can incorporate a spring, such as torsional spring 62 to urge the handle 12 into the open position.

As shown in FIG. 1, when the device 10 is in the aligned configuration, the elements of the working end 14 are generally aligned with each other for easy insertion into the crab leg section 16. By comparison, as shown in FIG. 2 when the device 10 is in the spread configuration, the working end 14 is spread apart to puncture and slit the shell of the crab leg section 16. The closed configuration of the handle 12 corresponds to the spread configuration of the working end 14, while the open configuration of the handle corresponds to the aligned configuration of the working end.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

What is claimed is:

1. A device for use in dressing a piece of shellfish, comprising:
   a handle portion having a first handle member and a second handle member movable relative thereto between at least first and second positions; and
   a working portion having a first end coupled to the handle portion and terminating at an opposing second end in an insertion tip sized and shaped to be insertable into the piece of shellfish, the working portion having first and second blades, each blade having opposing proximal and distal ends and a central portion therebetween, the proximal ends of the blades being coupled to the first and second handle members, respectively, the first and second blades being coupled to each other, the blades being adapted such that their central portions are movable laterally in response to movement of the handle members; and wherein
   the first and second blades are operable through manipulation of the handle members to move between an aligned configuration in which the first and second blades are at least substantially aligned with each other to facilitate insertion of the insertion tip into the piece of shellfish, and a spread configuration in which the central portion of at least one of the blades is spaced apart laterally from the central portion of the other blade.

2. The device of claim 1, further comprising a biasing member configured to urge the second handle member into the first position.

3. The device of claim 1 wherein the first and second blades are coupled together at locations proximate their distal ends.

4. The device of claim 1 wherein the first and second blades are pivotally coupled to each other.

5. The device of claim 1 wherein the blades are in the aligned configuration when the second handle member is in the first position and the blades are in the spread configuration when the second handle member is in the second position.

6. The device of claim 1 wherein the blades are fixedly coupled with respect to the handle members, respectively, to move therewith as a unit.

7. The device of claim 1 wherein the handle members are pivotally coupled to each other.

8. The device of claim 1 wherein at least one of the blades is bifurcated at a pivotal linkage located at least near the central portion of the blade whereby the proximal portion of the blade can pivot with respect to the distal portion of the blade to move between the aligned and spread configurations.

9. The device of claim 1 wherein the blades are bifurcated at a pivotal linkage located at least near the central portions of the blades whereby the proximal portions of the blades can pivot with respect to the distal portions of the blades to move between the aligned and spread configurations.

10. The device of claim 1 wherein the blades are bifurcated at a pivotal linkage located at least near the central portions of the blades whereby the proximal portions of the blades can pivot with respect to the distal portions of the blades to move between the aligned and spread configurations, and wherein the first blade is configured to pivot in a direction opposite to the second blade.

11. The device of claim 1 wherein the blades are made from a substantially rigid material.

12. A device for use in dressing a piece of shellfish, comprising:
   a handle having first and second handle members, at least one of the handle members being manually movable with respect to the other between an open configuration in which the handle members are spaced apart from each other and a closed configuration in which at least a portion of the one of the handle members is positioned proximate a portion of the other; and
   a working end having first and second arms, each arm having opposing proximal and distal ends and a central portion therebetween, the proximal ends of the arms being coupled to the first and second handle members, respectively, the distal ends of the arms terminating coincident with a terminal end of the device to facilitate insertion of the device into the piece of shellfish, and the first and second arms being coupled together at locations at least near the distal end of each of the arms; and wherein the first and second arms are operable through manipulation of the handle members to move between an aligned configuration in which the first and second arms are at least substantially aligned with each other and the device can be inserted into the piece of shellfish, and a spread configuration in which the central portion of at least one of the arms is spaced apart from the central portion of the other arm.

13. The device of claim 12, further comprising a biasing member configured to urge the at least one of the first and second handle members into the open configuration.

14. The device of claim 12 wherein the first and second arms are coupled together at their extreme distal ends.

15. The device of claim 12 wherein the central portions of the first and second arms are located between the respective handle member and the locations where the arms are coupled together.

16. The device of claim 12 wherein the arms are in the aligned configuration when the handle members are in the open configuration and the arms are in the spread configuration when the handle members are in the closed configuration.

17. The device of claim 12 wherein at least one of the arms is bifurcated at a pivotal connection located at least near the central portion of the arm whereby the proximal portion of the arm can pivot with respect to the distal portion of the arm to move between the aligned and spread configurations.

18. The device of claim 12 wherein the first and second arms are bifurcated at a pivotal connection located at least near the central portion of the arms whereby the proximal portions of the arms can pivot with respect to the distal portions of the arms to move between the aligned and spread configurations, and wherein the first arm is configured to pivot in a direction opposite that of the second arm.

19. The device of claim 12 wherein the arms are made from a substantially rigid material.

20. A device for dressing a piece of shellfish, comprising:
a first blade having a length with proximal, distal and central portions, the first blade configured such that the central portion can move laterally with respect to both the proximal and distal portions, the distal end of the first blade being sized and shaped to facilitate its insertion into the piece of shellfish;
a second blade having a length with proximal, distal and central portions, the second blade configured such that the central portion can move laterally with respect to both the proximal and distal portions, the distal end of the second blade being sized and shaped to facilitate its insertion into the piece of shellfish; wherein
the proximal portions of the first and second blades are movably coupled to each other; and
an actuator coupled to the proximal ends of the first and second blades, the actuator being configured to selectively move the central portions of the first and second blades between an aligned configuration in which the first and second blades are at least substantially aligned with each other and the distal ends of the blades can be inserted into the piece of shellfish, and a spread configuration in which the central portion of the blades are spaced apart from each other.

21. The device of claim 20 wherein the actuator is manually operable to move the blades between the aligned and spread configurations.

22. A method for dressing a piece of shellfish to facilitate removing a shell therefrom, comprising:
inserting at least two bars of a linkage having at least four interconnected bars into the piece of shellfish;
actuating the linkage to spread at least two of the bars laterally apart from each other within the piece of shellfish until at least one bar penetrates a shell; and
removing the linkage while the at least two bars are actuated to create a slit in the shell.

23. The method of claim 22 wherein the linkage is connected to a handle, and wherein actuating the linkage comprises manually manipulating the handle.

24. The method of claim 22 wherein the linkage is connected to a pair of opposing handle members, and wherein actuating the linkage comprises manually moving at least one of the handle members with respect to the other.

25. The method of claim 22 wherein the linkage is connected to a pair of opposing handle members, and wherein actuating the linkage comprises manually pivoting at least one of the handle members with respect to the other.

26. The method of claim 22 wherein the linkage is connected to a pair of opposing handle members, and wherein actuating the linkage comprises squeezing the handle members together.

* * * * *